(12) United States Patent
Takahashi

(10) Patent No.: US 7,403,299 B2
(45) Date of Patent: Jul. 22, 2008

(54) QUERYING OF COPYRIGHT HOST, PRINTING OF COPYRIGHT INFORMATION AND HOST REGISTRATION OF COPYRIGHT DATA

(75) Inventor: Tadashi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 11/231,783

(22) Filed: Sep. 22, 2005

(65) Prior Publication Data

US 2006/0015534 A1    Jan. 19, 2006

Related U.S. Application Data

(62) Division of application No. 09/520,161, filed on Mar. 7, 2000, now Pat. No. 6,972,856.

(30) Foreign Application Priority Data

Mar. 11, 1999   (JP)   .................................. 11-065329
Mar. 2, 2000    (JP)   .............................. 2000-057654

(51) Int. Cl.
   *G06F 15/00*  (2006.01)
   *G06K 1/00*   (2006.01)
   *G06K 15/00*  (2006.01)
   *H04N 1/40*   (2006.01)

(52) U.S. Cl. .................................... 358/1.14; 358/3.28

(58) Field of Classification Search ................. 358/1.1, 358/1.14, 1.13, 1.15, 3.28, 3.29, 1.18, 537, 358/540, 452, 462

See application file for complete search history.

(56) References Cited

U.S. PATENT DOCUMENTS

| 5,671,277 | A | 9/1997 | Ikenoue et al. |
| 6,327,600 | B1 * | 12/2001 | Satoh et al. .................. 715/207 |
| 6,343,283 | B1 | 1/2002 | Saito et al. |
| 6,553,129 | B1 * | 4/2003 | Rhoads ........................ 382/100 |
| 6,735,699 | B1 | 5/2004 | Sasaki et al. |
| 2001/0011252 | A1 | 8/2001 | Kasahara |

FOREIGN PATENT DOCUMENTS

| JP | 5-081549 | 4/1993 |
| JP | 08-292976 | 11/1996 |
| JP | 10-150517 | 6/1998 |
| JP | 11-259764 A | 9/1999 |
| JP | 11-288556 | 10/1999 |
| JP | 11-345261 A | 12/1999 |
| JP | 2000-020600 A | 1/2000 |

* cited by examiner

*Primary Examiner*—Douglas Q. Tran
(74) *Attorney, Agent, or Firm*—Fitzpatrick, Cella, Harper & Scinto

(57) ABSTRACT

A search for copyright-related information contained in image data is conducted. If no such information is detected, a database is queried to determine whether it contains copyright-related information corresponding to the image represented by this image data. Information relating to a copyright in accordance with the result of querying the database is added onto the image data. This prevents the unauthorized copying of a copyrighted article in an environment in which digitized copyrighted articles can be exchanged by networking and electronic filing.

6 Claims, 14 Drawing Sheets

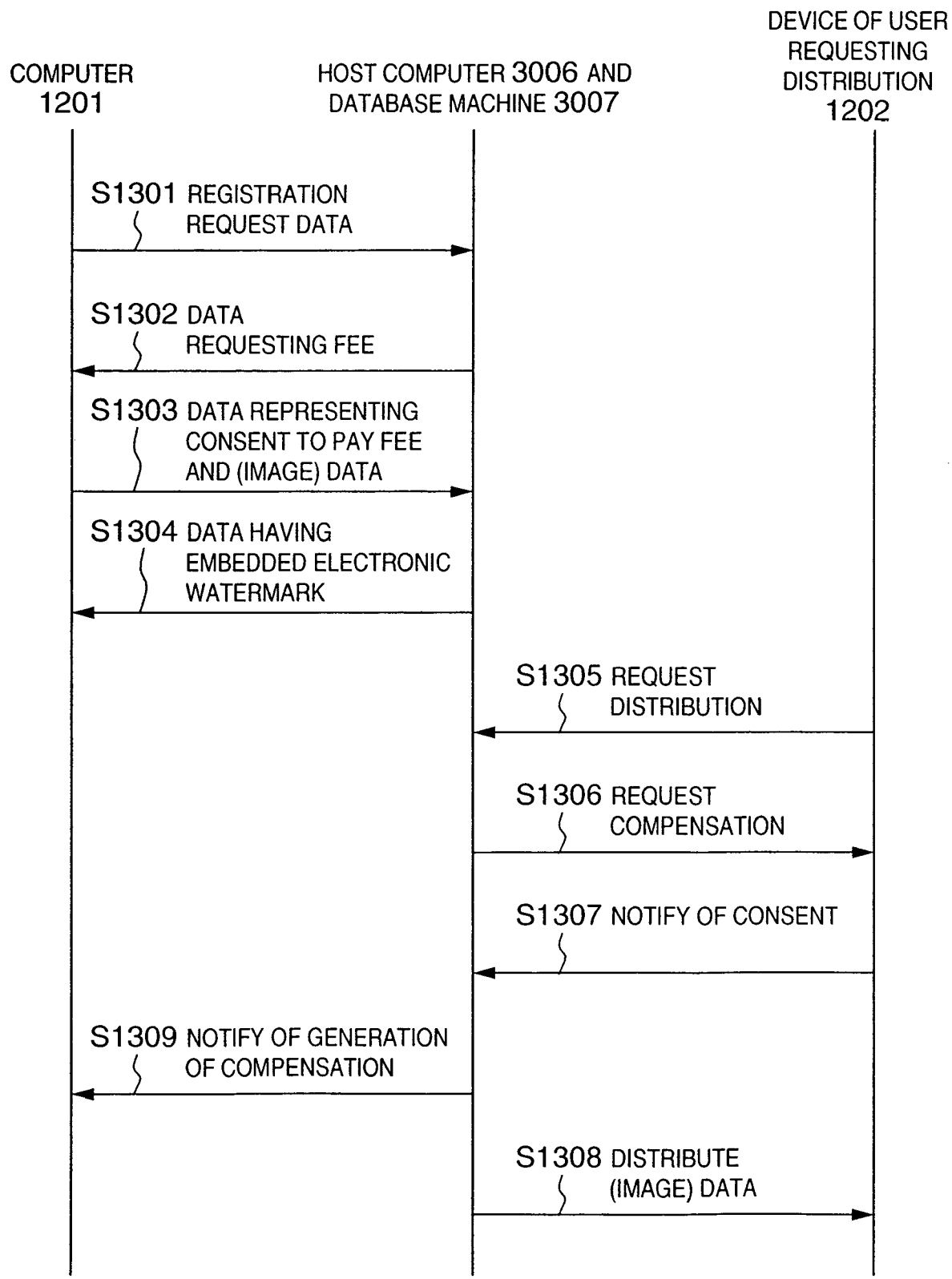

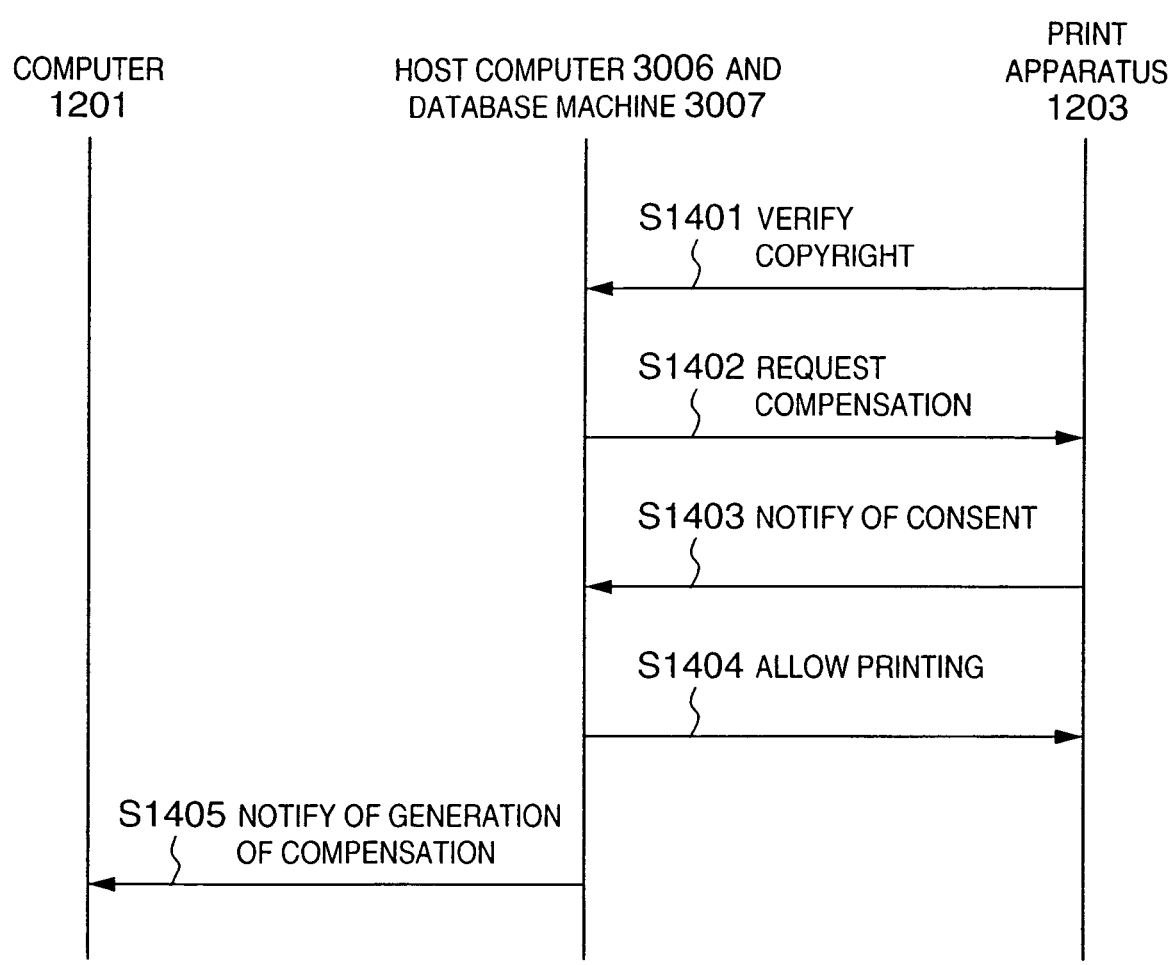

QUERYING OF COPYRIGHT HOST, PRINTING OF COPYRIGHT INFORMATION AND HOST REGISTRATION OF COPYRIGHT DATA

This application is a division of application Ser. No. 09/520,161 filed Mar. 7, 2000, now U.S. Pat. No. 6,972,856.

FIELD OF THE INVENTION

This invention relates to an image processing apparatus and method and to a storage medium for implementing the same.

BACKGROUND OF THE INVENTION

Recent improvements in the performance of color copiers have been accompanied by the development of functions which prevent the copying of banknotes, securities such as stock certificates and bonds, commuter passes, prize tickets and gold notes. (These articles shall be referred to as "specific documents" below.)

One method known as a technique to prevent the copying of a specific document includes comparing read image data with image data representing the specific document stored in memory in advance, determining based upon the comparison whether the image is one that may be copied, and executing processing on the printer side in such a manner that the image will not be printed out normally if the result of the determination is that copying is not allowed.

Recently, however, advances in networking and electronic filing have been made and images in the form of digital information are now being exchanged over networks. As a consequence, it is difficult to prevent unlawful copying of digitized copyrighted documents and images merely by a copying preventing function provided on the printer side.

SUMMARY OF THE INVENTION

Accordingly, an object of the present invention is to provide an image processing apparatus, image processing method and associated storage medium ideal for protecting copyrighted articles.

According to the present invention, the foregoing object is attained by providing an image processing apparatus comprising: input means for inputting image data; detecting means for detecting information relating to a copyright contained in the input image data; querying means which, if no information relating to the copyright is detected, is for querying a database as to whether information relating to a copyright corresponding to an image represented by the input image data exists in the database; and add-on means for adding information relating to a copyright, which conforms to the result of querying the database, onto the input image data.

Another object of the present invention is to provide an image processing apparatus, image processing method and associated storage medium having novel functions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a diagram showing the flow of processing according to the fourth embodiment; and FIG. 14 is a diagram showing the flow of processing according to the fourth embodiment.

DESCRIPTION OF THE PREFERRED EMBODIMENTS

Preferred embodiments of the present invention will now be described in detail with reference to the drawings. It should be noted that images acquired from all publications capable of being copyrighted and all images capable of being copyrighted shall be referred to as "copyrighted articles".

First Embodiment

Scanner

Figure 1:
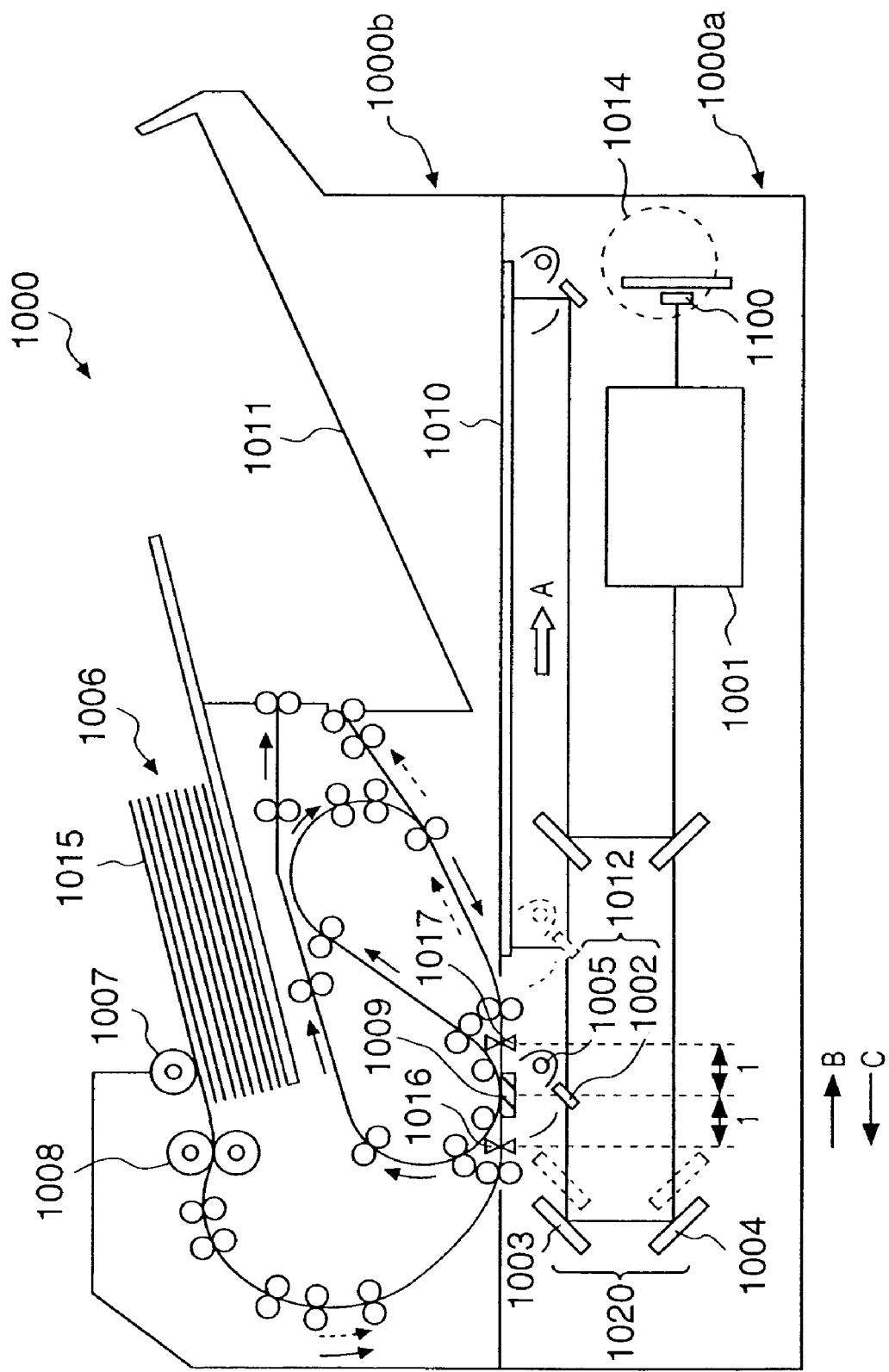
FIG. 1 is a diagram illustrating an example of the construction of a scanner according to a first embodiment of the present invention.

FIG. 1 is a diagram illustrating an example of the construction of a scanner 1000 according to this embodiment. The scanner 1000 includes a scanner main body 1000a and a document feeder 1000b.

The scanner main body 1000a includes a glass platen 1010 on which a document is placed, and a first mirror unit 1012. The first mirror unit 1012 includes a halogen lamp 1005 for illuminating a document, and a first reflecting mirror 1002. A second mirror unit 1020 includes a second reflecting mirror 1003 and a third reflecting mirror 1004. A lens unit 1001 is for forming the image of reflecting light from a document onto a color CCD linear image sensor (referred to simply as a "CCD" below) 1100. A glass platen 1009 is for a case where continuous reading of documents is performed using the document feeder 1000b.

Scanning for reading a document in the arrangement described above will now be described. A document is placed upon the glass platen 1010 and the mirror units 1012 and 1020 are transported in the direction of arrow A (the sub-scan direction) at a speed of 2:1 by a stepping motor 1014 so that the image of the document will be read. In this case movement of the mirror units 1012 and 1020 starts from the positions indicated by the dotted lines in FIG. 1.

The document feeder 1000b includes a paper supply tray 1006 for supplying documents, a pick-up roller 1007 for picking up a document, feed rollers 1008 for feeding a document, and a paper drop tray 1011. Documents are stacked on the paper supply tray 1006 in such a manner that the sides to be scanned are faced upward.

In a case where a single side of a document is to be scanned, the document is sent to the feed rollers 1008 by the pick-up roller 1007. The document fed by the feed rollers 1008 in conformity with the scanning timing is transported along the path indicated by the dotted-line arrows, passes by the glass platen 1009 and is ejected into the paper drop tray 1011. Light reflected from the document passing above the glass platen 1009 has its image formed on the CCD 1100 through the first mirror units 1012, 1020 and lens unit 1001.

In a case where both sides of a document are to be scanned, the document fed by the pick-up roller 1007 is transported along the path indicated by the solid arrows and the image on the front side of the document is read as the front side passes by the glass platen 1009. The document is then turned over in accordance with the transport path indicated by the solid arrows and has the image on its back side read from a direction opposite that in which the front side was read. The document is then ejected into the paper drop tray 1011 in a manner similar to that when one side only is read. It should be noted that the direction in which the document is transported above the glass platen 1009 is the direction indicated by arrow B when the front side is read and the direction indicated by arrow C when the back side is read. Accordingly, reading in the direction of arrow B shall be referred to as reading in the forward direction and reading in the direction of arrow C shall be referred to as reading in the reverse direction.

Image Processing Circuit

Figure 2:
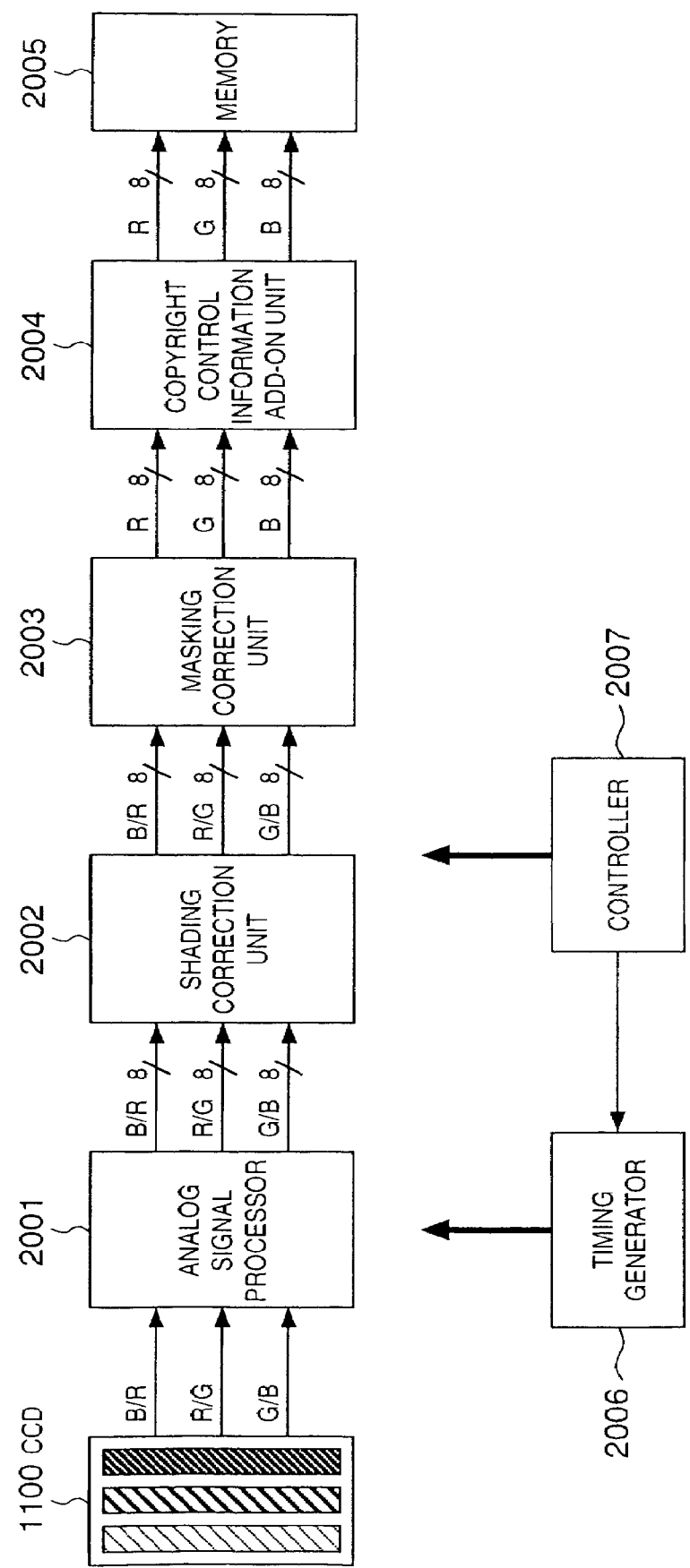
FIG. 2 is a block diagram illustrating an example of the construction of a signal processing circuit in the scanner shown in FIG. 1.

FIG. 2 is a block diagram illustrating an example of the construction of a signal processing circuit in the scanner 1000.

Signals of respective colors output from the CCD 1100 enter an analog signal processor 2001, where the signals are sampled and held, adjusted to a predetermined signal level by a gain control amplifier and then converted to digital data of eight bits per color by an A/D converter. It should be noted that the amplifier gain and the reference level (offset) of the A/D converter in the analog signal processor 2001 are changed over in dependence upon the direction in which the image is read.

A shading correction unit 2002, which corrects for a variance in sensitivity from one pixel to another in the CCD 1100, has two types of correction data in conformity with the reading direction (forward or reverse). The reason for this is that the signals output from the CCD 1100 are color signals that differ depending upon the reading direction. This derives from that the fact that the charge transfer path in the CCD 1100 differs depending upon the reading direction (forward or reverse). It should be noted that the shading correction unit 2002 possesses also a function which corrects for a signal shift (color shift) caused by difference is the spacing positions of R, G, B lines in the CCD 1100.

A masking correction unit 2003, which corrects the RGB color space, has two types of correction coefficients that correspond to the reading directions (forward and reverse). Accordingly, the output of the masking correction unit 2003 is fixed in regard to the color regardless of the reading direction.

Control information relating to copyright is added by a copyright control information add-on unit 2004 onto the digital data of each color normalized by the processing executed by the units from the analog signal processor 2001 to the masking correction unit 2003. The adding on of the copyright control information will be described in detail later. The digital data of each color onto which the copyright control information has been added is stored temporarily in a memory 2005 and, in response to a command from the user, is sent to a device such as a film recorder, printer, personal computer or facsimile machine.

Gain and offset of the analog signal processor 2001, memory control for adjustment of the color shift by the shading correction unit 2002 and setting and control of the correction coefficients of the masking correction unit 2003 in the circuit described above are managed by a controller 2007. A clock and timing pulses necessary for each block are generated by a timing generator 2006, which is controlled by the controller 2007.

In the description rendered above, an image scanner is taken as an example of the image input device. However, this does not impose a limitation upon the invention. For example, images may be input from image input devices such as a digital still camera, digital video camera and film scanner. In addition, a case in which an image that has been stored on a recording medium such as an optical disk or magnetic disk is input also is covered by this embodiment.

Copyright Control Information

Figure 4:
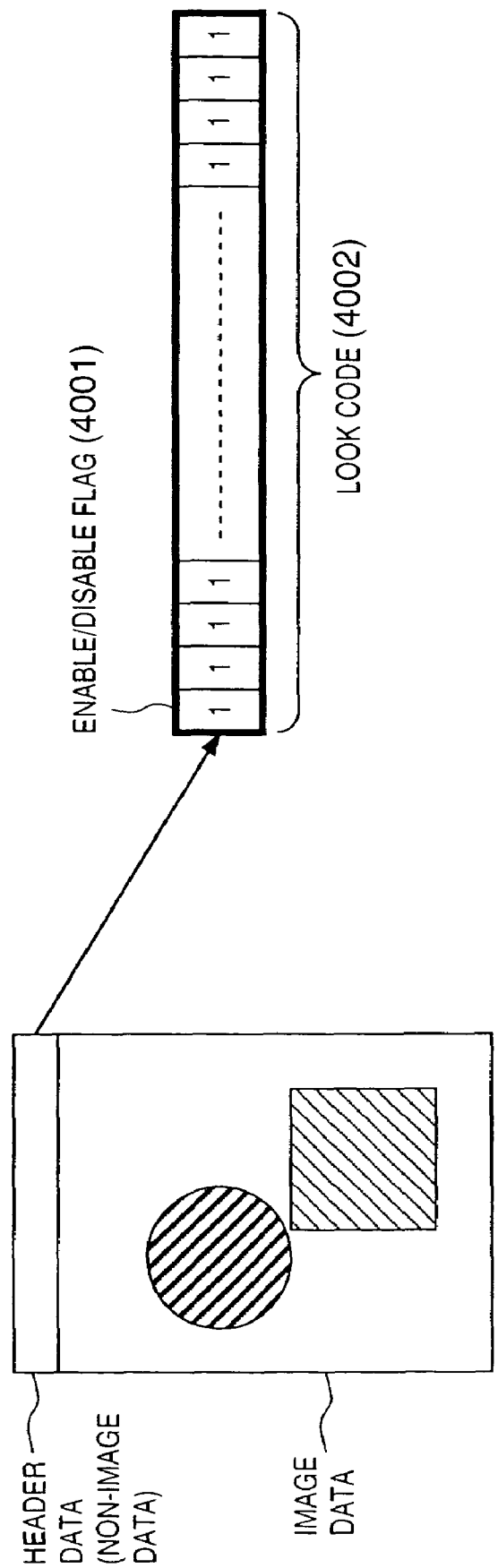
FIG. 4 is a diagram useful in describing the manner in which copyright control information is added onto the image of a copyrighted article.

FIG. 4 is a diagram useful in describing the addition of copyright control information to an image of a copyrighted article. Here control information relating to a copyright is added on as header data to an area (referred to as a "non-image area" below) other than a data area of an image of interest.

The header data includes an enable/disable flag 4001 for determining whether printing should be allowed or not, and a lock code 4002, which is a code specific to a copyrighted article that contains an electronic file. The image is printable if the enable/disable flag 4001 is logical "1" and is not printable if the enable/disable flag 4001 is logical "0". In an instance where it is desired to print image data for which the enable/disable flag 4001 is logical "0", it is necessary to acquire, upon paying suitable compensation, a code corresponding to the lock code 4002 from the publisher or author possessing the copyright.

The enable/disable flag 4001 is utilized not only to indicate whether printing is allowed or not but also to determine whether or not it is allowed to record on film by a film recorder, to record on a recording medium such as an optical disk, magnetic disk, smart card or compact flash (CF) card, or to transmit via a network or communication line.

Copyright Control Information Add-on Unit

Figure 3:
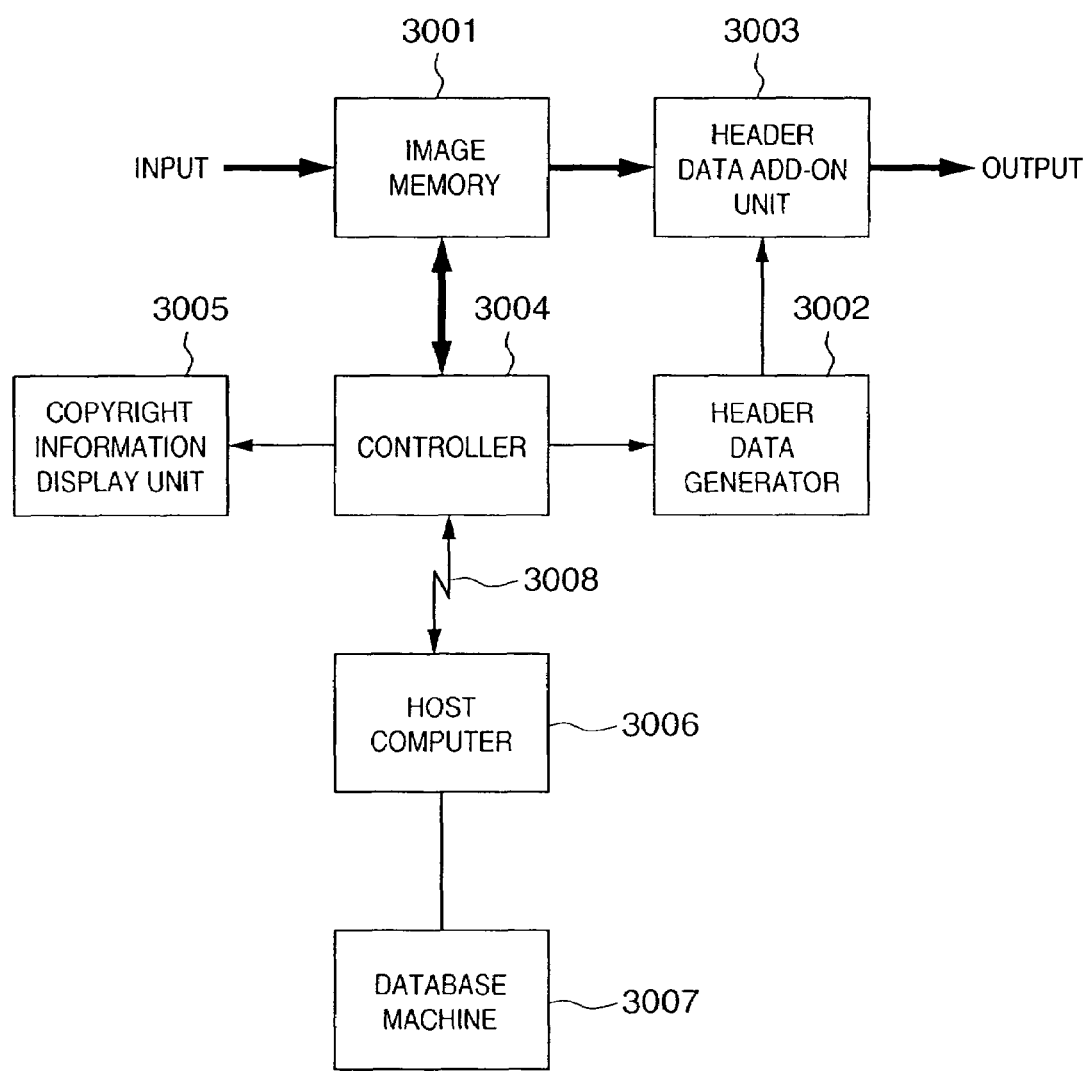
FIG. 3 is a block diagram illustrating an example of the construction of a copyright control information add-on unit shown in FIG. 2.

FIG. 3 is a block diagram illustrating an example of the construction of the copyright control information add-on unit 2004.

As shown in FIG. 3, the copyright control information add-on unit 2004 includes an image memory 3001 for storing the image data of a document; a header data generator 3002 for generating copyright control information based upon information from a controller 3004; a header data add-on unit

3003 for adding header data, which is generated by the header data generator 3002, onto image data; the controller 3004, for controlling the designation, display and communication of control information relating to a copyright; a copyright information display unit 3005 for displaying information relating to a copyright; a host computer 3006 for managing a database machine 3007; and a line 3008.

When image data output from the masking correction unit 2003 is stored in the image memory 3001, the controller 3004 accesses the external host computer 3006 via the line 3008 and checks to see whether the image represented by image data that has been stored in the image memory 3001 is a copyrighted article. More specifically, the controller 3004 sends the image data or a part thereof stored in the image memory 3001 to the host computer 3006 and receives information relating to the copyright that corresponds to this image data. Of course, if there is no information relating to a copyright corresponding to this image data, the host computer 3006 issues a response indicating "no information relating to copyright".

The controller 3004 then instructs the header data generator 3002 to generate header data. The header data generated is added onto the image data by header data add-on unit 3003. Copyright control information that has been or will be added onto the image data is displayed on the copyright information display unit 3005.

Figure 5:
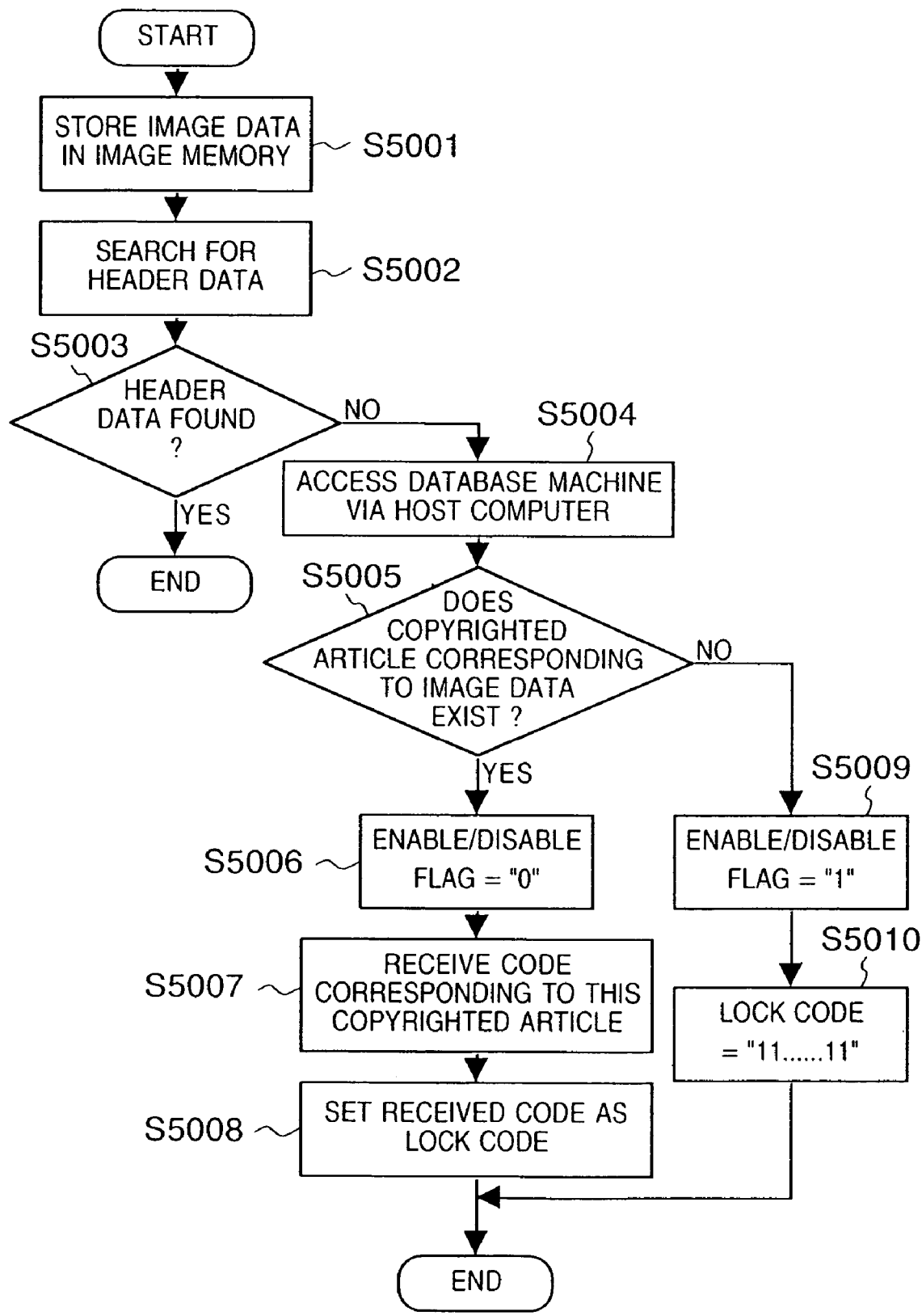
FIG. 5 is a flowchart useful in describing the generation of header data.

Generation of the header data will be described with reference to FIG. 5. The processing shown in FIG. 5 is executed by the controller 3004.

If image data is stored in the image memory 3001 (S5001), the controller 3004 conducts a search to determine whether the image data has header data that includes copyright control information (S5002). Processing exits if header data is found.

If there is no header data, the controller 3004 accesses the database machine 3007 via the host computer 3006 (S5004) to determine whether the image represented by the image data is a copyrighted article (S5005). For example, if image data corresponding to or resembling image data stored in the image memory 3001 has been registered in the database machine 3007 as a copyrighted article, then the controller 3004 judges that the image data stored in the image memory 3001 represents a copyrighted article and sets the enable/disable flag 4001 to "0" (S5006). The controller 3004 receives the code corresponding to this copyrighted article via the host computer 3006 (S5007), sets the received code as the lock code (S5008) and terminates processing.

On the other hand, if image data corresponding to or resembling image data stored in the image memory 3001 has not been registered in the database machine 3007, then the controller 3004 sets the enable/disable flag 4001 to "1" (S5009) and sets "111 . . . 1", for example, as the lock code 4002 to indicate that the image represented by the image data stored in the image memory 3001 is not a copyrighted article. The value set as the lock code 4002 is not particularly limited as long as it does not overlap the code specific to the copyrighted article.

Thus, header data inclusive of copyright control information can be added onto image data by the copyright control information add-on unit 2004, thereby making it possible to protect the copyright of the image data. It should be noted that adding printing inhibit information to an image, which has been created by the user him/herself, for the purpose of protecting the copyright of the image can be carried out by connecting a copyright information input unit to the copyright control information add-on unit 2004, etc.

Second Embodiment

A second embodiment of the present invention will now be described Components in this embodiment substantially similar to those of the first embodiment are designated by like reference characters and are not described in detail again.

Figure 7:
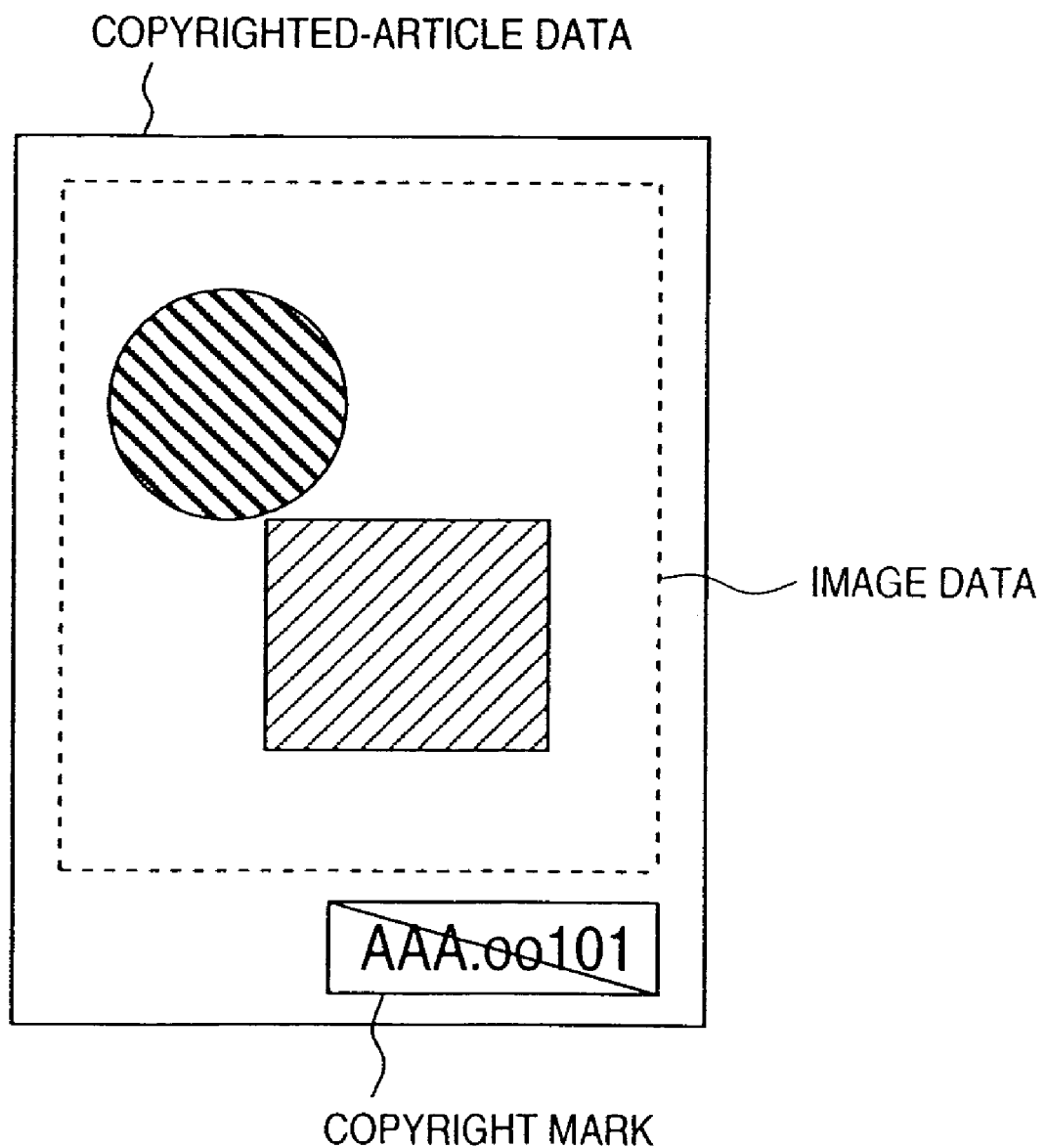
FIG. 7 is a diagram useful in describing the manner in which copyright control information is added onto the image of a copyrighted article in the second embodiment.

FIG. 7 is a diagram useful in describing the manner in which copyright control information is added onto the image of a copyrighted article in the second embodiment. Here a copyright mark serving as control information relating to a copyright is added onto the non-image area of an image of interest. The copyright mark is composed of a mark representing printing enable/disable (e.g., a diagonal line attached to a copyright mark shown in FIG. 7 indicates printing disable), a logo of the supplier and a management number of the copyrighted article. If it is desired to print an image represented by image data having a copyright mark for which disable has been set, it is necessary to acquire the code of the management number from the publisher or author possessing the copyright. It should be noted that a watermark can be utilized as the copyright mark.

Figure 6:
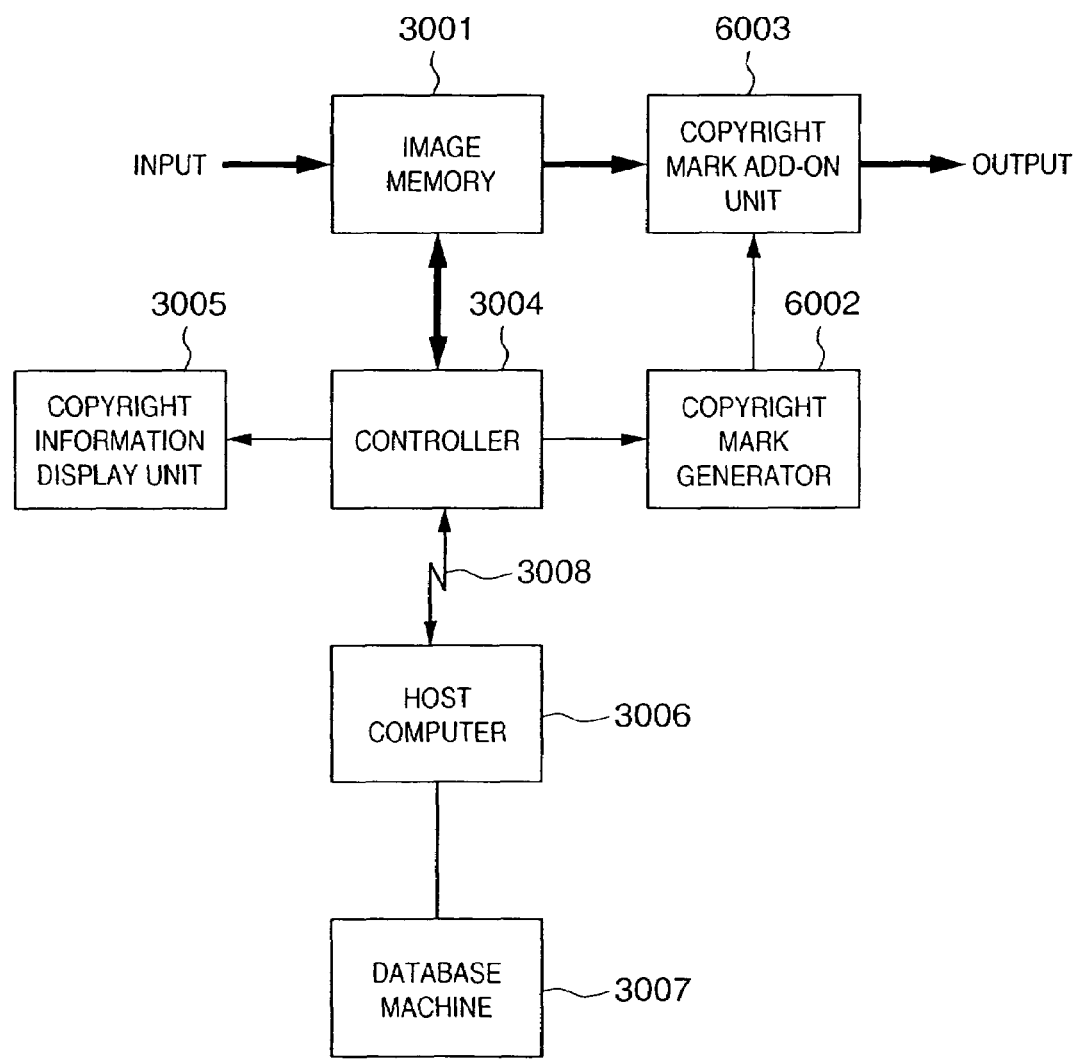
FIG. 6 is a block diagram illustrating an example of the construction of a copyright control information add-on unit according to a second embodiment of the present invention.

FIG. 6 is a block diagram illustrating an example of the construction of the copyright control information add-on unit 2004 according to the second embodiment. The copyright control information add-on unit 2004 in this embodiment includes a copyright mark generator 6002 for generating copyright control information based upon information from the controller 3004, and a copyright mark add-on unit 6003 for adding the copyright mark, which has been generated by the copyright mark generator 6002, onto image data.

Figure 8:
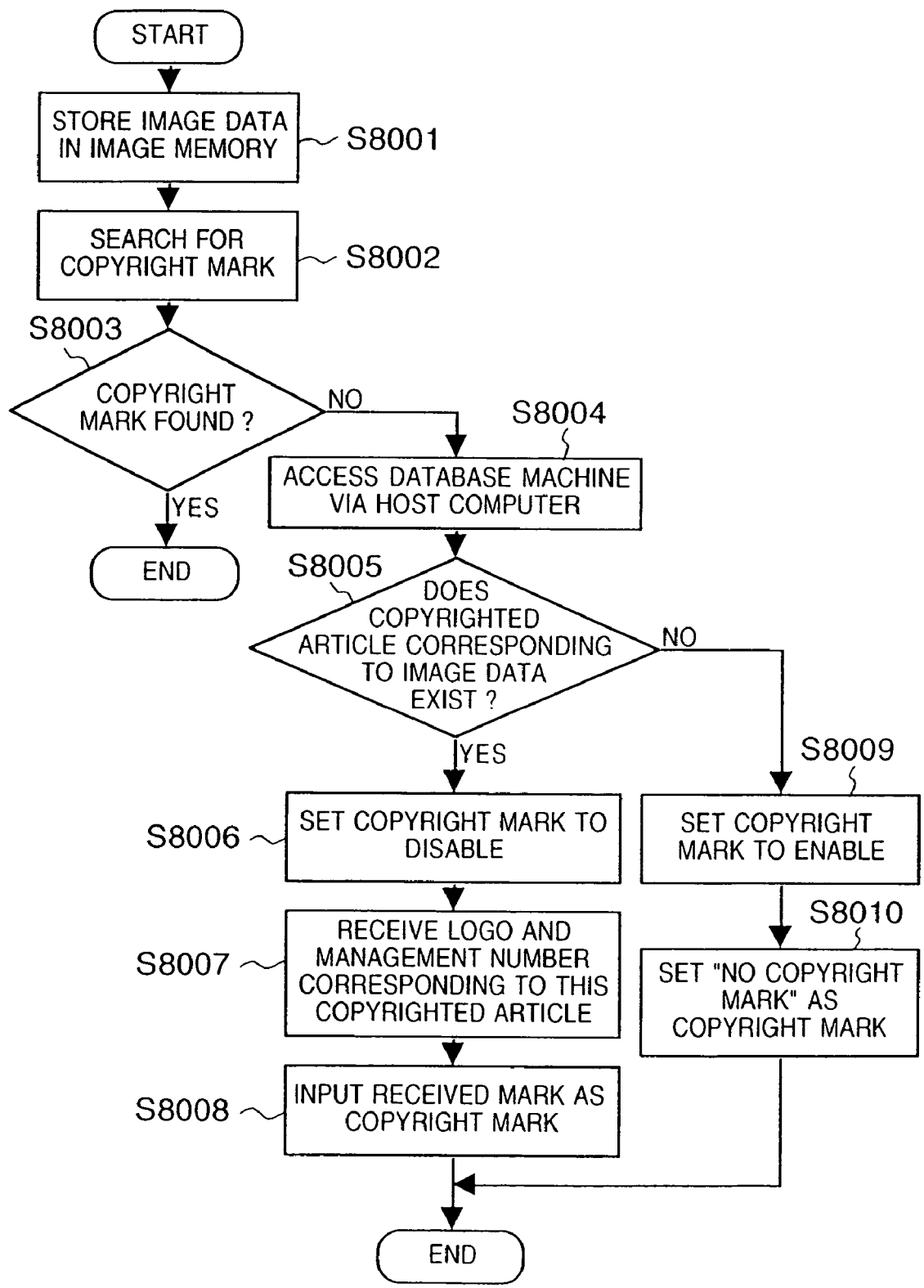
FIG. 8 is a flowchart useful in describing the generation of a copyright mark.

Generation of the copyright mark will be described with reference to FIG. 8. The processing shown in FIG. 8 is executed by the controller 3004.

If image data is stored in the image memory 3001 (S8001), the controller 3004 conducts a search to determine whether the image data has a copyright mark (S8002). Processing exits if a copyright mark is found.

If there is no copyright mark, the controller 3004 accesses the database machine 3007 via the host computer 3006 (S8004) to determine whether the image represented by the image data is a copyrighted article (S8005). For example, if image data corresponding to or resembling image data stored in the image memory 3001 has been registered in the database machine 3007 as a copyrighted article, then the controller 3004 judges that the image data stored in the image memory 3001 represents a copyrighted article and sets the copyright mark to disable (S8006). The controller 3004 receives the logo and the management number corresponding to this copyrighted article via the host computer 3006 (S8007), sets the received logo and management number as the copyright mark (S8008) and terminates processing.

On the other hand, if image data corresponding to or resembling image data stored in the image memory 3001 has not been registered in the database machine 3007, then the controller 3004 sets the copyright mark to enable (S8009) and sets information indicative of "no copyright mark" as the copyright mark (S8010).

Thus, a copyright mark inclusive of copyright control information can be added onto image data by the copyright control information add-on unit 2004, thereby making it possible to protect the copyright of the image data. It should be noted that adding a copyright mark to an image, which has been created by the user him/herself, for the purpose of protecting the copyright of the image can be carried out by connecting a copyright information input unit to the copyright control information add-on unit 2004, etc.

Third Embodiment

A third embodiment of the present invention will now be described Components in this embodiment substantially similar to those of the first embodiment are designated by like reference characters and are not described in detail again.

Figure 10:
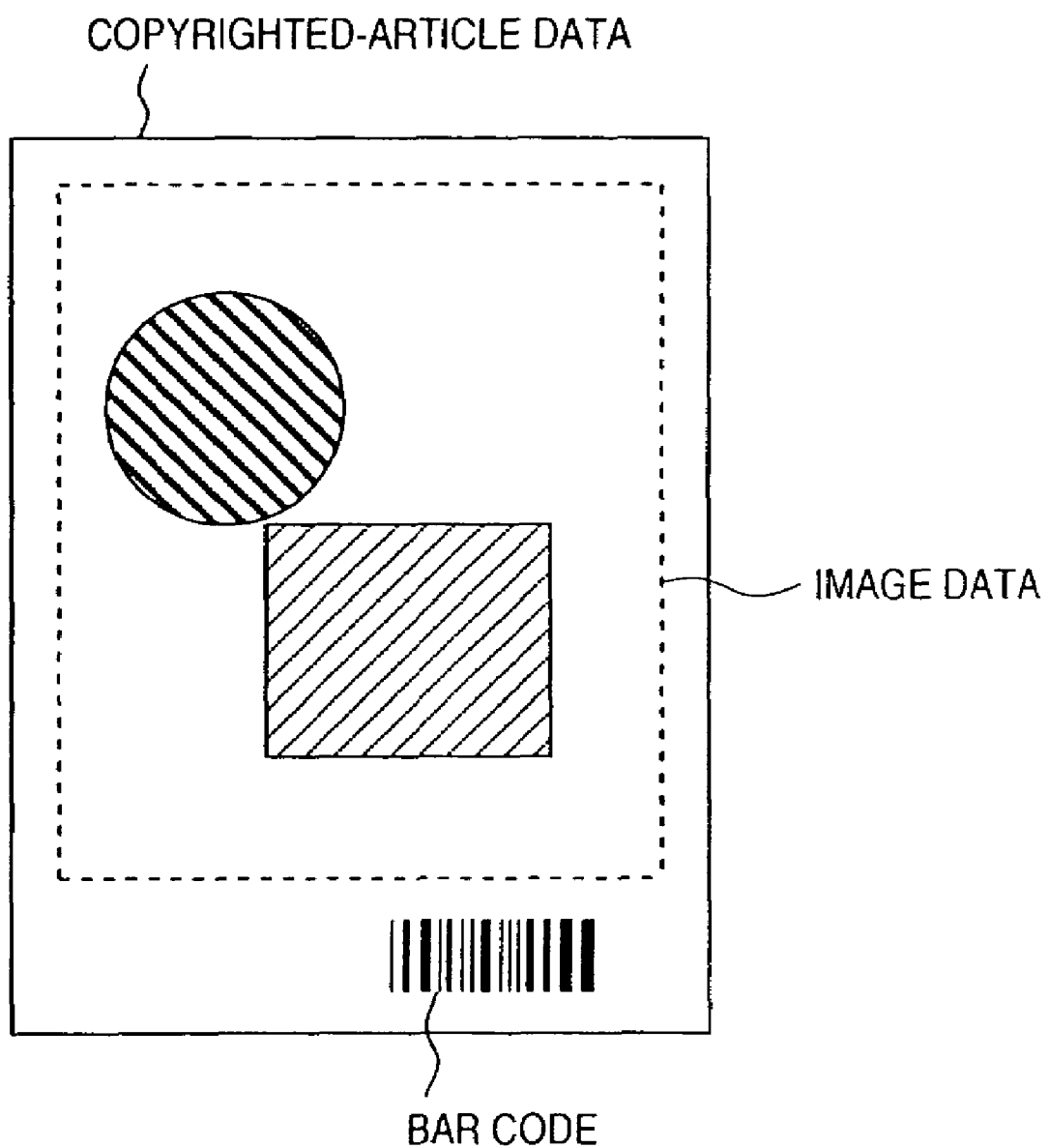
FIG. 10 is a diagram useful in describing the manner in which copyright control information is added onto the image of a copyrighted article in the third embodiment.

FIG. 10 is a diagram useful in describing the manner in which copyright control information is added onto the image of a copyrighted article in the third embodiment. Here a bar code serving as control information relating to a copyright is added onto the non-image area of an image of interest. The bar code is composed of an enable/disable flag representing whether printing should be allowed or not, and a lock code. If it is desired to print an image represented by image data for which the enable/disable flag has been set to disable, it is necessary to acquire the code corresponding to this copyrighted article from the publisher or author possessing the copyright.

Figure 9:
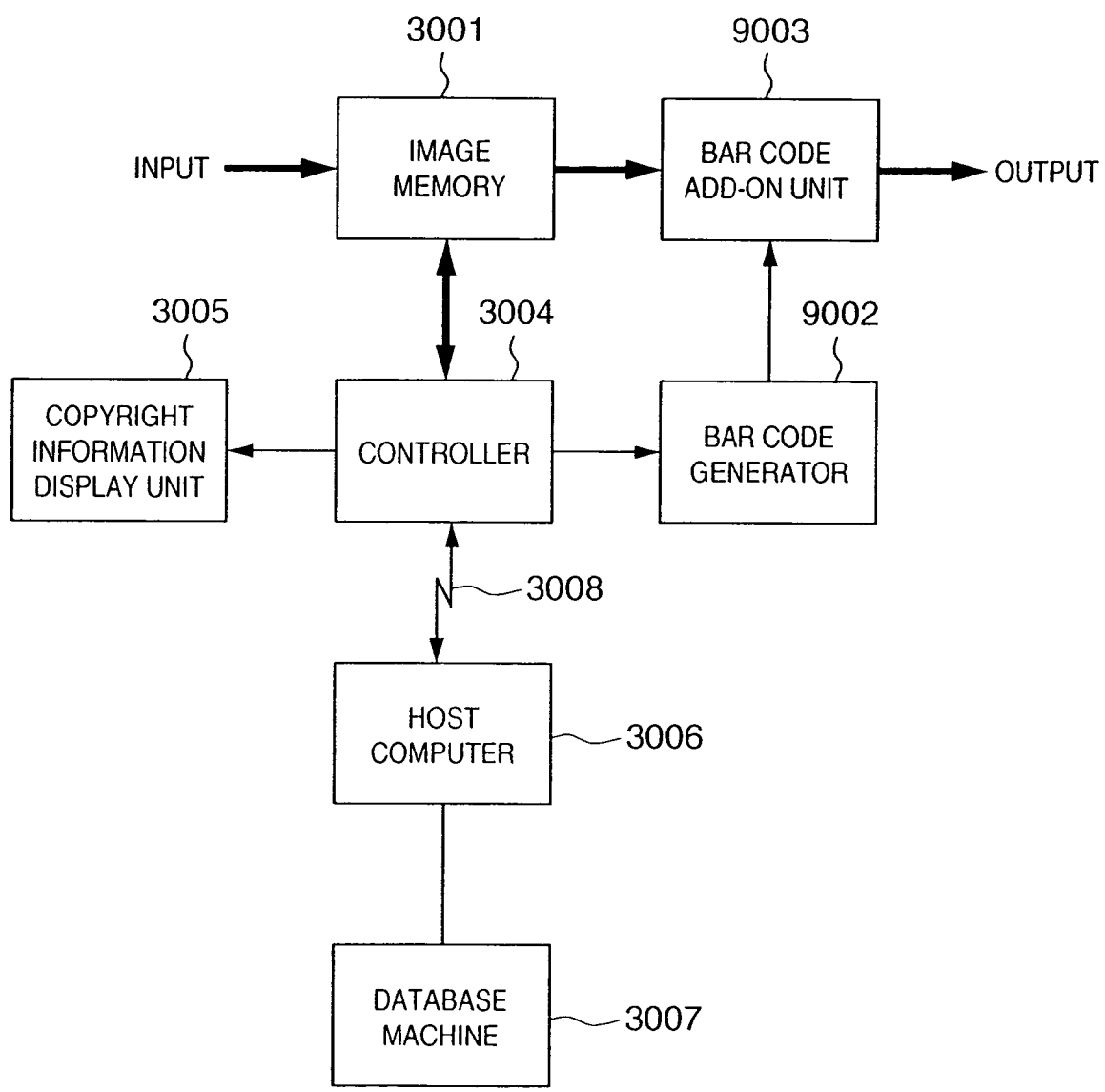
FIG. 9 is a block diagram illustrating an example of the construction of a copyright control information add-on unit according to a third embodiment of the present invention.

FIG. 9 is a block diagram illustrating an example of the construction of the copyright control information add-on unit 2004 according to the third embodiment. The copyright control information add-on unit 2004 in this embodiment includes a bar code generator 9002 for generating a bar code, which indicates copyright control information, based upon information from the controller 3004, and a bar code add-on unit 9003 for adding the bar code, which has been generated by the bar code generator 9002, onto image data.

Figure 11:
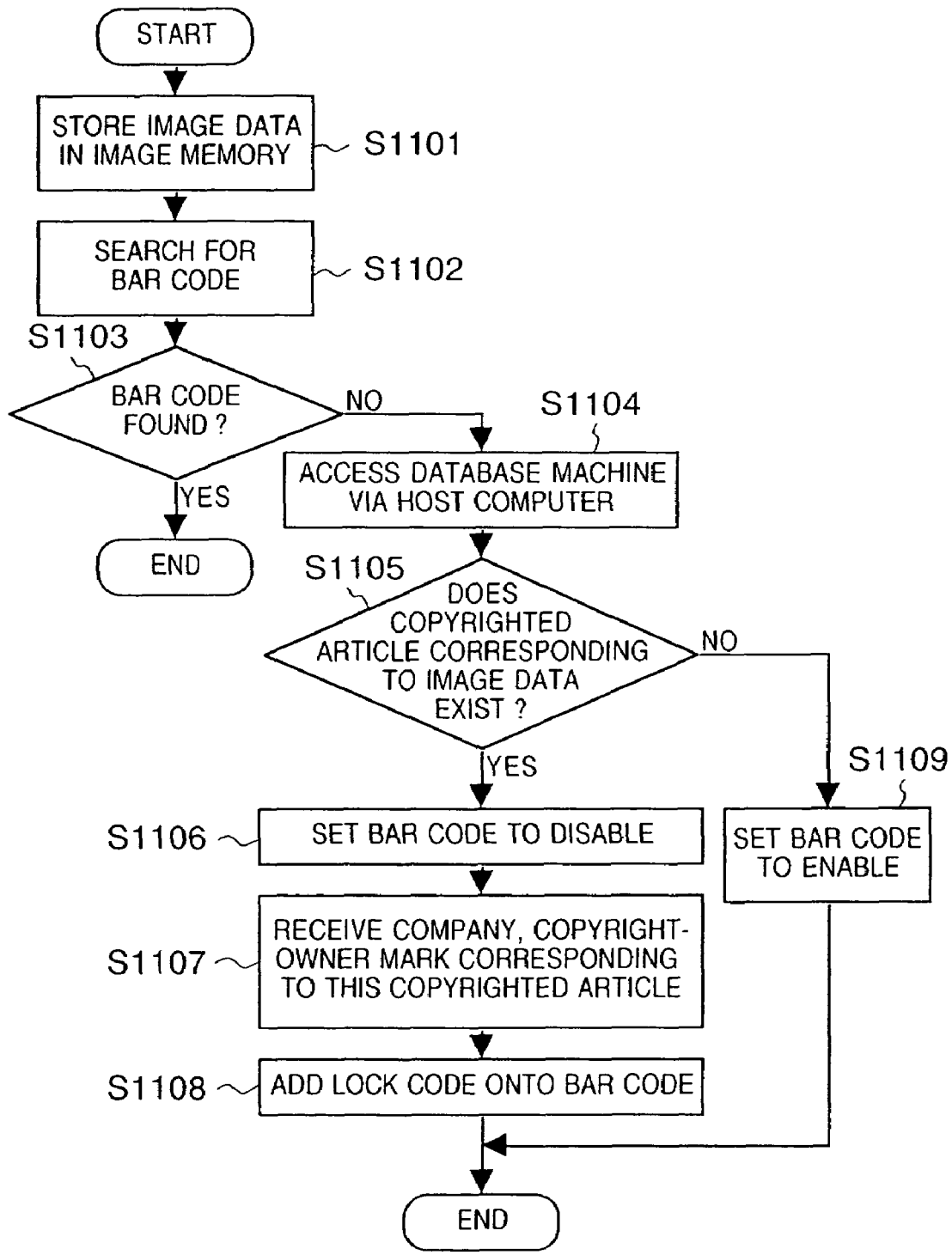
FIG. 11 is a flowchart useful in describing the generation of a bar code.

Generation of the copyright mark will be described with reference to FIG. 11. The processing shown in FIG. 11 is executed by the controller 3004.

If image data is stored in the image memory 3001 (S1101), the controller 3004 conducts a search to determine whether the image data has a bar code (S1102). Processing exits if a copyright mark is found.

If there is no bar code, the controller 3004 accesses the database machine 3007 via the host computer 3006 (S1104) to determine whether the image represented by the image data is a copyrighted article (S1105). For example, if image data corresponding to or resembling image data stored in the image memory 3001 has been registered in the database machine 3007 as a copyrighted article, then the controller 3004 judges that the image data stored in the image memory 3001 represents a copyrighted article and sets the enable/disable flag to disable (S1106). The controller 3004 receives the code corresponding to this copyrighted article via the host computer 3006 (S1107), sets the received code as the lock code (S1108) and terminates processing.

On the other hand, if image data corresponding to or resembling image data stored in the image memory 3001 has not been registered in the database machine 3007, then the controller 3004 sets the enable/disable flag to enable (S1109).

Thus, a bar code inclusive of copyright control information can be added onto image data by the copyright control information add-on unit 2004, thereby making it possible to protect the copyright of the image data. It should be noted that adding a bar code to an image, which has been created by the user him/herself, for the purpose of protecting the copyright of the image can be carried out by connecting a copyright information input unit to the copyright control information add-on unit 2004, etc.

Thus, in accordance with each of the embodiments described above, control information relating to a copyright can be added onto image data when a copyrighted article is scanned or after it is scanned. This makes it possible to prevent unlawful copying such as copying or second-generation copying of copyrighted articles, thereby making it possible to prevent the unauthorized distribution of copyrighted articles as digital data.

Fourth Embodiment

An example in which (image) data is registered in the database machine 3007 will be described in the fourth embodiment.

Figure 12:
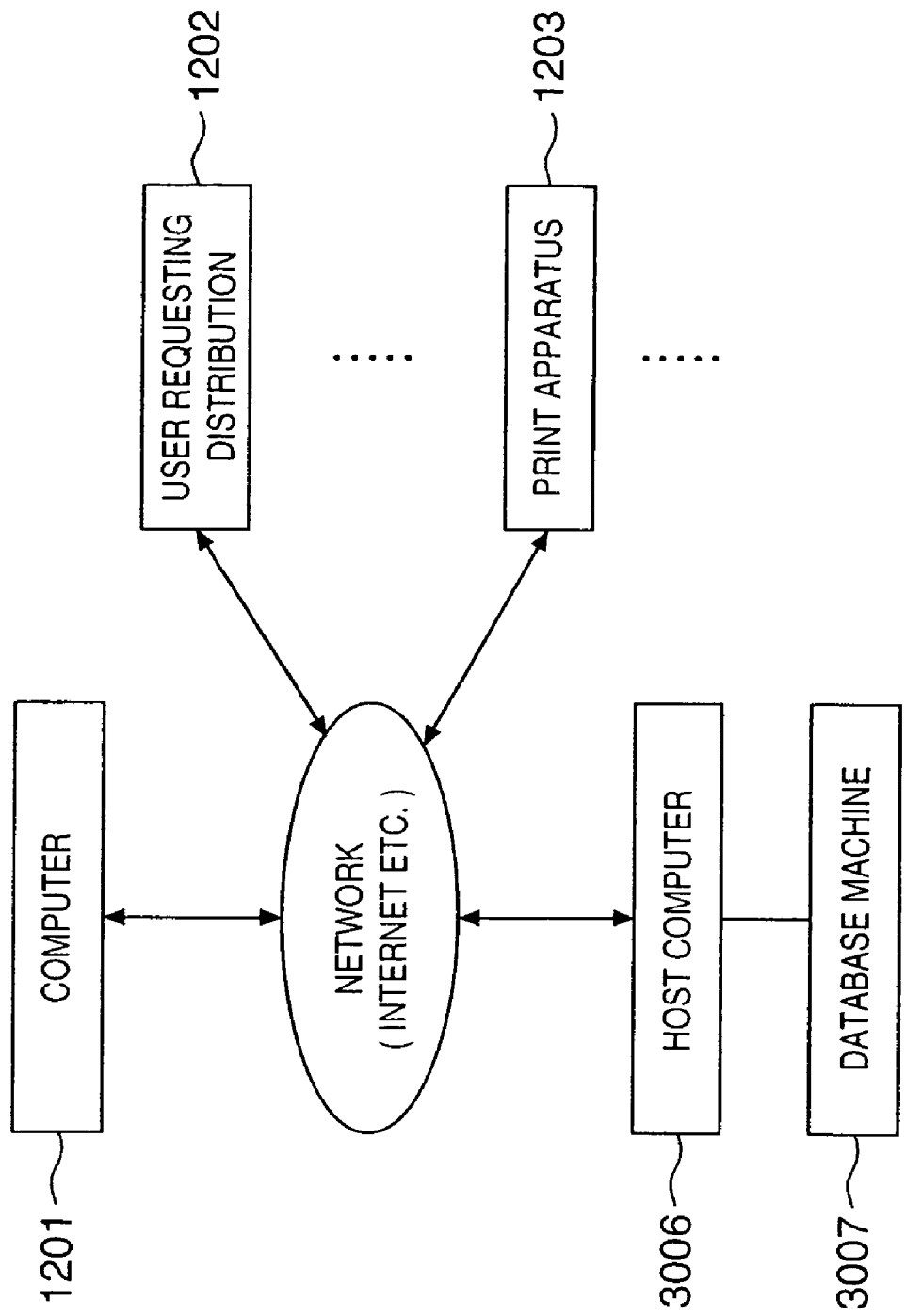
FIG. 12 is a diagram showing the configuration of a system according to a fourth embodiment of the present invention.

FIG. 12 is a diagram showing the configuration of a system comprising the database machine 3007, the computer 1201 and a network.

Described below is the procedure through which the operator of the computer 1201 in the system of FIG. 12 registers a copyright with the database machine 3007, and an example in which data that has been registered for copyright in the database machine 3007 is distributed to requesting user devices via the host computer 3006.

First, the operator of the computer 1201 is connected to the host computer 3006 and database machine 3007 via the network, such as the Internet. It should be noted that the network is not limited to the Internet and may be a cable, wireless or optical communication line, etc.

(Image) data captured by photography or created by the operator of the computer 1201 is input from a scanner, digital camera or storage medium such as optical disk (none of which are shown) connected to the computer via an interface. If necessary, the entered (image) data is edited by a software executed in the computer 1201 and stored in a storage unit such as the hard disk of the computer.

The operator operates a keyboard, mouse, etc., of the computer 1201 to output copyright registration request data to the host computer 3006, which manages the database machine 3007, via the network (S1301 in FIG. 13). It should be noted that the registration request data includes information concerning the term over which copyright of the (image) data is desired to be protected, information on monetary compensation when the data is distributed (printed), information concerning the amount of this data and information related to the holder of the copyright.

In conformity with the information concerning the desired term of copyright protection and the information concerning the amount of data, the host computer 3006 sends data requesting a fee back to the computer 1201 via the above-mentioned network (S1302).

The fee consists of a commission required for protection of a copyright for which compensation is demanded of a user 1202, shown in FIG. 12, who has issued a distribution/print request when the copyrighted article is to be distributed/printed, and a commission for executing processing to collect compensation for distributed data from the destination of the distributed data when the (image) data is published on a Web page possessed by the host computer 3006 and distribution of this (image) data is carried out.

The commission concerning publication at a website is collected at regular intervals during the term of publication and is a uniform commission at the start of publication. However, the greater the number of distributions in response to distribution requests during the term of publication of this (image) data on the Web page, the lower the commission at the regular intervals becomes. Further, the shorter the term of publication of the (image) data on the Web page, the lower the commission.

In a case where the operator of the computer 1201 wishes to protect a copyright by paying the fee, the operator sends notification of consent to pay the fee for copyright protection and the image (data) to be registered to the host computer 3006 via the network. When publication on a Web page is desired, the operator of the computer 1201 sends the computer 3006 notification also of consent to pay the fee for publication on the Web page and for processing to collect compensation (S1303).

It should be noted that the above-mentioned compensation is not uniquely decided by the request from the computer 1201. It may be decided by a practical compensation setting at the host computer 3006 or by a discussion between the operators of the host computer 3006 and computer 1200. Further, compensation may be decided by the circumstances of trial publication and distribution on the Web page possessed by the host computer 3006.

The host computer 3006 receives the consent to pay the fee as well as the (image) data, embeds (a) information indicative of the copyrighted article, which information corresponds to the lock code, copyright mark or bar code described in the first to third embodiments, (b) the code specific to the copyrighted article and (c) the address information of the host computer 3006 such as Uniform Resource Locator (URL) in the received (image) data in the form of an electronic watermark, and then sends the resulting data to the computer 1201 via the network (S1304). Subsequnetly, this (image) data embedded the electronic watermark is used, as a result of which data other than (image) data for which a copyright has been registered will not be circulated.

Any method of embedding the electronic watermark may be used. For example, the method may be one in which data is superimposed upon data having a frequency that is invisible to the eye or, in the case of a data image, one in which information is superimposed using a yellow color that is almost invisible to the eye.

In a case where this (image) data is printed, (image) data having an embedded electronic watermark will be printed. When printing (copying) based upon this printed matter is performed, electronic watermark extraction means installed in a printing apparatus 1203 shown in FIG. 12 can be used. By way of example, the electronic watermark is converted to frequency data and the absence or presence of an electronic watermark at a specific frequency is investigated. By using color separation, the absence or presence of a color component (yellow) not readily visible to the eye can be determined. Verification of a copyright from the printing apparatus 1203 to the host computer 3006 can be executed and, as a result, compensation for printing of the copyrighted article can be collected. The details will be described with reference to FIG. 14.

Information indicative of a copyrighted article corresponding to the lock code, copyright mark or bar code described earlier, the code specific to the copyrighted article (the copyrighted article management code) and the address information of the host computer 3006 are embedded as the electronic watermark at the host computer 3006 and the result is stored in the database machine 3007.

In a case where a request to distribute the (image) data published on a Web page arrives at the host computer 3006 via the network (S1305), the host computer 3006 requests compensation from the distribution requesting user 1202 in accordance with the compensation information decided by any of the methods mentioned above (S1306). When notification of consent is received (S1307) from the distribution requesting user 1202 via the network in response to this request, the (image) data having the embedded electronic watermark stored in the database machine 3007 is distributed to the distribution requesting user 1202 by the host computer 3006 (S1308).

It should be noted that when this distribution of data is carried out, the computer 1201 (the holder of the copyright) is notified that generation of monetary compensation accompanied the distribution (S1309).

The processing for scanning and printing printed matter based upon copyrighted (image) data as in the first to third embodiment will now be described in accordance with FIG. 14.

(Image) data that has thus been distributed has an embedded electronic watermark. If it is assumed, therefore, that printed matter based upon this (image) data has been scanned, the host computer 3006 is queried in the manner described in the first to third embodiments. Querying is carried out by using the address information of the host computer 3006 contained in the electronic watermark information. In response to the query, the operation (S1401) for verifying the copyright of the distributed (image) data in the host computer 3006 is carried out and the compensation request (S1402) conforming to such verification is issued.

In a case where notification of consent to the compensation request has been received from the print apparatus 1203, the host computer 3006 gives notification of permission to print to the print apparatus 1203 (S1404) and notifies the computer 1201 of generation of compensation (S1405).

By virtue of the arrangement described above, it is possible to register the copyright of (image) data in the host computer 3006, publish the (image) data on a Web page, distribute the (image) data, collect compensation and protect a copyright when printed matter is scanned/printed It should be noted that an arrangement may be adopted in which when the address of the computer 1201, such as a TCP/IP address, URL, an E-mail address or the like, also is added onto registration request data at S1301 and the host computer 3006 distributes the (image) data in response to a distribution request, the address of the computer 1201 also is added onto the distributed (image) data as an electronic watermark. As a result, the distribution requesting user obtains the address information of the computer 1201 from the electronic watermark and accesses the computer 1201 directly, thereby making it possible to acquire other (image) data directly from the operator of the computer 1201.

Other Embodiment

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is attained by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

In a case where the present invention is applied to the above-mentioned storage medium, program code corresponding to the above-described flowcharts would be stored on the storage medium.

Thus, as described above, an object of the present invention is to provide an image processing apparatus and method which function to protect the copyright of articles such as digitized documents and images. In particular, an object of the present invention is to provide copyright protection in terms of image processing by furnishing various input image data with copyright-related information in suitable and reliable fashion.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting image data;
    detecting means for detecting information relating to a copyright contained in the input image data;
    querying means which, if no information relating to the copyright is detected, is for querying a database as to whether information relating to a copyright corresponding to an image represented by the input image data exists in the database; and
    add-on means for adding information relating to a copyright, which conforms to the result of querying the database, onto the input image data.

2. The apparatus according to claim 1, wherein said input means is an image input device.

3. The apparatus according to claim 1, further comprising display means for displaying the information relating to the copyright.

4. The apparatus according to claim 1, wherein said querying means transmits the input image data to the database and receives from said database information relating to a copyright corresponding to this input image data.

5. An image processing method comprising the steps of:
    inputting image data;
    detecting information relating to a copyright contained in the input image data;
    if no information relating to the copyright is detected, querying a database as to whether information relating to a copyright corresponding to an image represented by the input image data exists in the database; and
    adding information relating to a copyright, which conforms to the result of querying the database, onto the input image data.

6. A computer readable recording medium on which program code for image processing has been recorded, said program code including at least:
    code of a step of inputting image data;
    code of a step of detecting information relating to a copyright contained in the input image data;
    code of a step in which, if no information relating to the copyright is detected, a database is queried as to whether information relating to a copyright corresponding to an image represented by the input image data exists in the database; and
    code of a step of adding information relating to a copyright, which conforms to the result of querying the database, onto the input image data.

* * * * *

UNITED STATES PATENT AND TRADEMARK OFFICE
CERTIFICATE OF CORRECTION

| | |
|---|---|
| PATENT NO. | : 7,403,299 B2 |
| APPLICATION NO. | : 11/231783 |
| DATED | : July 22, 2008 |
| INVENTOR(S) | : Tadashi Takahashi |

It is certified that error appears in the above-identified patent and that said Letters Patent is hereby corrected as shown below:

Col. 3, line 66, "difference is" should read --differences in--.

Col. 6, line 4, "described" should read --described.--.

Col. 7, line 4, "described" should read --described.--.

Col. 9, line 10, "computer 1200." should read --computer 1201.--.

line 23, "embedded" should read --embedded with--.

Col. 10, line 7, "embodiment" should read --embodiments--.

line 29, "scanned/printed" should read --scanned/printed.--.

Signed and Sealed this

Thirteenth Day of January, 2009

JON W. DUDAS
*Director of the United States Patent and Trademark Office*